US008369968B2

(12) United States Patent
Brown et al.

(10) Patent No.: US 8,369,968 B2
(45) Date of Patent: Feb. 5, 2013

(54) SYSTEM AND METHOD FOR HANDLING DATABASE FAILOVER

(75) Inventors: Cory D. Brown, Austin, TX (US); Anthony Fernandez, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 450 days.

(21) Appl. No.: 12/417,823

(22) Filed: Apr. 3, 2009

(65) Prior Publication Data
US 2010/0257399 A1 Oct. 7, 2010

(51) Int. Cl.
*G05B 9/02* (2006.01)
*G06F 11/00* (2006.01)
*G06F 11/16* (2006.01)

(52) U.S. Cl. .................... 700/82; 714/4.11; 714/6.3
(58) Field of Classification Search ............ 700/11, 700/19, 21; 714/4.11, 6.3
See application file for complete search history.

(56) References Cited

U.S. PATENT DOCUMENTS

| | | | |
|---|---|---|---|
| 5,690,731 A | 11/1997 | Kurata et al. | |
| 5,728,213 A | 3/1998 | Kurata et al. | |
| 5,787,160 A * | 7/1998 | Chaney et al. | 379/112.06 |
| 5,787,163 A * | 7/1998 | Taylor et al. | 379/266.08 |
| 6,044,367 A * | 3/2000 | Wolff | 707/704 |
| 6,101,508 A * | 8/2000 | Wolff | 709/223 |
| 6,134,673 A * | 10/2000 | Chrabaszcz | 714/13 |
| 6,185,601 B1 * | 2/2001 | Wolff | 709/203 |
| 6,278,832 B1 | 8/2001 | Zagumennyi et al. | |
| 6,363,497 B1 * | 3/2002 | Chrabaszcz | 714/13 |
| 6,393,485 B1 * | 5/2002 | Chao et al. | 709/231 |
| 6,701,453 B2 * | 3/2004 | Chrabaszcz | 714/13 |
| 6,920,580 B1 * | 7/2005 | Cramer et al. | 714/4.11 |
| 6,944,788 B2 * | 9/2005 | Dinker et al. | 714/4.11 |
| 6,996,502 B2 * | 2/2006 | De La Cruz et al. | 714/48 |
| 7,036,039 B2 * | 4/2006 | Holland | 714/5.11 |
| 7,039,777 B2 * | 5/2006 | Yamagami et al. | 711/162 |
| 7,159,234 B1 * | 1/2007 | Murphy et al. | 725/87 |
| 7,177,886 B2 * | 2/2007 | Pruet, III | 1/1 |
| 7,194,543 B2 * | 3/2007 | Robertson et al. | 709/226 |
| 7,231,391 B2 * | 6/2007 | Aronoff et al. | 1/1 |
| 7,246,256 B2 * | 7/2007 | De La Cruz et al. | 714/4.11 |
| 7,246,345 B1 * | 7/2007 | Sharma et al. | 717/120 |

(Continued)

OTHER PUBLICATIONS

Vogels, W.; Dumitriu, D.; Birman, K.; Gamache, R.; Massa, M.; Short, R.; Vert, J.; Barrera, J.; and Gray, J., "The Design and Architecture of the Microsoft Cluster Service—A Practical Approach to High Availability and Scalability", Jun. 1998, 28th Annual Intl Symposium on Fault-Tolerant Computing, IEEE Xplore Digital Library.*

(Continued)

*Primary Examiner* — Mohammad Ali
*Assistant Examiner* — Kelvin Booker
(74) *Attorney, Agent, or Firm* — Larson Newman, LLP

(57) ABSTRACT

A system includes a first database, a second database, a third database, and an application server. The first database server includes a database instance. The second database server is in communication with the first database server. The second database server includes a mirror of the database instance. The third database server is in communication with the second database server. The third database server is configured to store a copy of a database within the database instance. The application server is configured to be placed in communication with the first, second, and third database servers, configured to fail over between the first and second database servers, and further configured to fail over between the second and third database servers.

17 Claims, 11 Drawing Sheets

U.S. PATENT DOCUMENTS

| | | | |
|---|---|---|---|
| 7,266,816 B1 * | 9/2007 | Sharma et al. | 717/170 |
| 7,321,893 B1 * | 1/2008 | Rambacher et al. | 1/1 |
| 7,383,463 B2 * | 6/2008 | Hayden et al. | 714/4.11 |
| 7,434,096 B2 * | 10/2008 | Callaway et al. | 714/6.1 |
| 7,444,538 B2 * | 10/2008 | Sciacca | 714/4.1 |
| 7,478,263 B1 * | 1/2009 | Kownacki et al. | 714/4.11 |
| 7,480,827 B2 * | 1/2009 | Callaway et al. | 714/6.3 |
| 7,496,579 B2 * | 2/2009 | Garbow et al. | 707/999.01 |
| 7,523,341 B2 * | 4/2009 | Hufferd et al. | 714/6.3 |
| 7,606,839 B2 * | 10/2009 | Aronoff et al. | 707/999.01 |
| 7,627,584 B2 * | 12/2009 | Claborn et al. | 707/999.01 |
| 7,627,776 B2 * | 12/2009 | Petruzzo | 714/6.12 |
| 7,631,013 B2 * | 12/2009 | Parsons et al. | 1/1 |
| 7,634,679 B2 * | 12/2009 | Quintiliano | 714/4.11 |
| 7,634,683 B2 * | 12/2009 | De La Cruz et al. | 714/4.1 |
| 7,636,741 B2 * | 12/2009 | Kulesza et al. | 1/1 |
| 7,668,879 B2 * | 2/2010 | Vivian et al. | 714/4 |
| 7,694,170 B2 * | 4/2010 | Callaway et al. | 714/4.1 |
| 7,734,596 B2 * | 6/2010 | Vivian et al. | 707/674 |
| 7,734,947 B1 * | 6/2010 | Frangioso et al. | 714/4.1 |
| 7,739,540 B2 * | 6/2010 | Akutsu et al. | 714/3 |
| 7,822,715 B2 * | 10/2010 | Petruzzo | 707/659 |
| 7,822,871 B2 * | 10/2010 | Stolorz et al. | 709/238 |
| 7,844,691 B2 * | 11/2010 | Gopalakrishnan | 709/223 |
| 7,849,221 B2 * | 12/2010 | Kumar et al. | 709/248 |
| 7,912,464 B2 * | 3/2011 | Jiang | 455/432.1 |
| 7,958,385 B1 * | 6/2011 | Frangioso et al. | 709/223 |
| 7,971,094 B1 * | 6/2011 | Benn et al. | 714/13 |
| 7,992,034 B2 * | 8/2011 | Callaway et al. | 714/4.11 |
| 8,024,600 B2 * | 9/2011 | Sciacca | 714/4.11 |
| 8,069,139 B2 * | 11/2011 | Garbow et al. | 707/609 |
| 8,074,107 B2 * | 12/2011 | Sivasubramanian et al. | 714/6.3 |
| 8,230,256 B1 * | 7/2012 | Raut | 714/13 |
| 2002/0188513 A1 * | 12/2002 | Gil et al. | 705/22 |
| 2003/0009437 A1 * | 1/2003 | Seiler et al. | 707/1 |
| 2003/0154236 A1 * | 8/2003 | Dar et al. | 709/201 |
| 2003/0172331 A1 | 9/2003 | Cherian et al. | |
| 2003/0233518 A1 * | 12/2003 | Yamagami et al. | 711/114 |
| 2004/0010502 A1 * | 1/2004 | Bomfim et al. | 707/100 |
| 2004/0015408 A1 * | 1/2004 | Rauen et al. | 705/26 |
| 2004/0103195 A1 * | 5/2004 | Chalasani et al. | 714/4 |
| 2004/0107381 A1 * | 6/2004 | Bomfim et al. | 714/4 |
| 2004/0162836 A1 * | 8/2004 | Aronoff et al. | 707/100 |
| 2005/0149684 A1 | 7/2005 | Sankaran et al. | |
| 2005/0172161 A1 * | 8/2005 | Cruz et al. | 714/4 |
| 2005/0192035 A1 * | 9/2005 | Jiang | 455/461 |
| 2005/0193245 A1 * | 9/2005 | Hayden et al. | 714/13 |
| 2005/0198631 A1 | 9/2005 | Bisher et al. | |
| 2005/0268156 A1 | 12/2005 | Mashayekhi et al. | |
| 2006/0015773 A1 | 1/2006 | Singh et al. | |
| 2006/0248198 A1 * | 11/2006 | Galchev | 709/227 |
| 2006/0259723 A1 * | 11/2006 | Petruzzo | 711/162 |
| 2007/0041386 A1 | 2/2007 | Mar et al. | |
| 2007/0245167 A1 * | 10/2007 | De La Cruz et al. | 714/4 |
| 2008/0052313 A1 * | 2/2008 | Keen | 707/104.1 |
| 2008/0098003 A1 * | 4/2008 | Dias et al. | 707/10 |
| 2009/0070623 A1 * | 3/2009 | Sciacca | 714/4 |
| 2009/0106328 A1 * | 4/2009 | Callaway et al. | 707/202 |
| 2009/0119306 A1 * | 5/2009 | Garbow et al. | 707/10 |
| 2009/0181775 A1 * | 7/2009 | Nilsson et al. | 463/42 |
| 2009/0307166 A1 * | 12/2009 | Routray et al. | 706/46 |
| 2010/0017647 A1 * | 1/2010 | Callaway et al. | 714/4 |
| 2010/0030754 A1 * | 2/2010 | Petruzzo | 707/3 |
| 2010/0048197 A1 * | 2/2010 | Jiang | 455/422.1 |
| 2010/0325091 A1 * | 12/2010 | Petruzzo | 707/659 |
| 2011/0035563 A1 * | 2/2011 | Petruzzo | 711/162 |
| 2011/0072108 A1 * | 3/2011 | Gopalakrishnan | 709/217 |
| 2011/0219108 A1 * | 9/2011 | Lisiecki et al. | 709/223 |
| 2011/0246819 A1 * | 10/2011 | Callaway et al. | 714/6.3 |
| 2011/0252273 A1 * | 10/2011 | Callaway et al. | 714/4.11 |
| 2012/0005283 A1 * | 1/2012 | Provo et al. | 709/206 |
| 2012/0011391 A1 * | 1/2012 | Callaway et al. | 714/4.11 |

OTHER PUBLICATIONS

"Your Data, Any Place, Any Time," Microsoft SQL Data Services,Azure Service Platform, http://www.microsoft.com/azure/data.mspx.

"MS SQL Server Plugin," JH Software KBID 1211, http://www.simpledns.com/jhsoft/kbprint.aspx?kbid=1211&wsid=2.

"SteelEye LifeKeeper Protection Suite for SQL Server," InstantDoc #98732, Jun. 2008, http://www.sqlmag.com/articles/print.cfm?ArticleID=98732.

* cited by examiner

SYSTEM AND METHOD FOR HANDLING DATABASE FAILOVER

FIELD OF THE DISCLOSURE

This disclosure relates generally to information handling systems, and more particularly relates to a database failover.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

In database servers, data for multiple databases can be tightly coupled to a server process instance, and a single database server process instance can have multiple user databases that share common system databases. The databases on the servers occasionally need to be brought down for operating system and software patching. During these periods the databases can fail over to another database server and provide some uptime for the databases. If one database causes a failure, all of the databases on the instance have to be shut down and the entire instance has to be restarted on the failover database server. During this operation there is no application access to any of the databases on the instance until the instance is restarted on the failover server.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
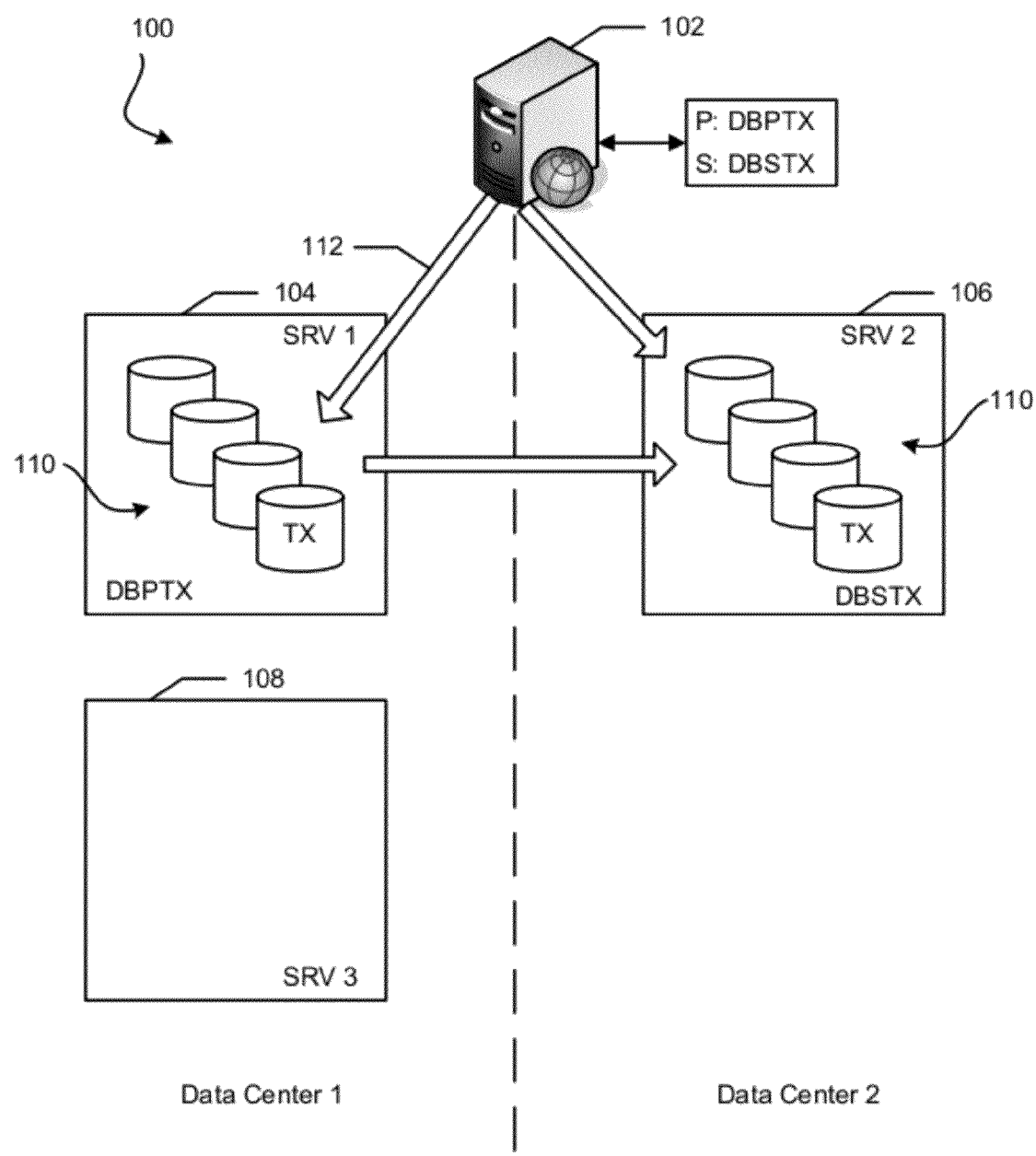
FIGS. 1-7 are block diagrams of a database server system.

FIG. 1 shows a database server system 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The database server system 100 includes an application server 102 and database servers 104, 106, and 108. The database servers 104 and 106 include a database instance 110. A database instance is the collection of databases stored on the database servers 104 and 106 that share a database operating system, and common system databases. The application server 102 is in communication with a first data center including the database servers 104 and 106, and a second data center including the database server 108.

In an embodiment, the database servers 104 and 108 can be located at the first data center, and the database server 106 can be located at the second database center. The application server 102 can store a primary database assignment of "DBPTX" and a secondary database assignment of "DBSTX." If the application server 102 attempts to access a database, such as the "TX" database, in the database instance 110 stored on the database servers 104 and 106, the application server can first initiate communication with the primary database server as stored in the application server. Therefore, the application server 102 can first initiate communication with the database instance 110 on the database server 104, via communication link 112, to retrieve and/or manipulate the data on the TX database.

Figure 2:
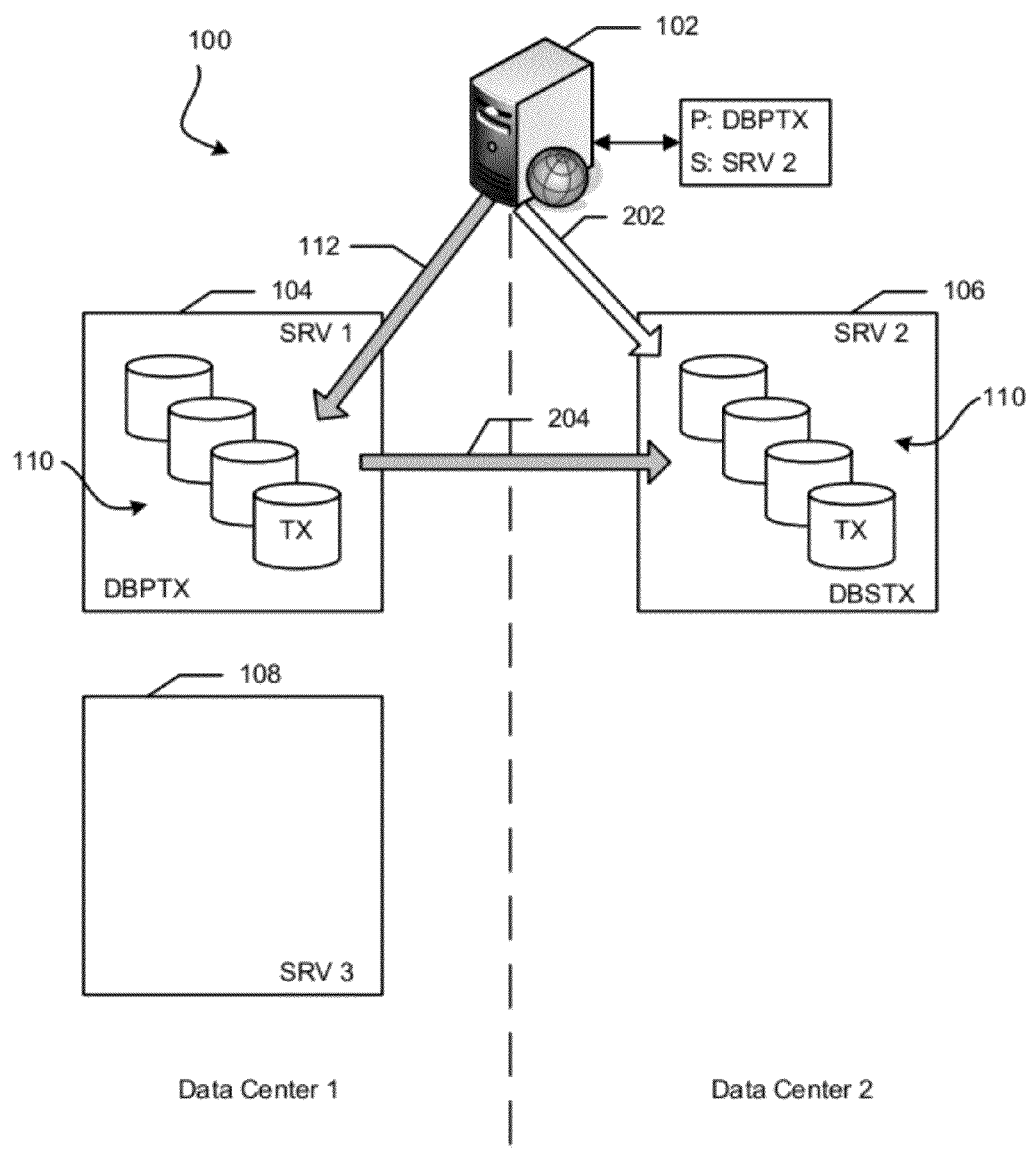

As shown in FIG. 2, the application server 102 can initiate an active communication with the database server 104 via communication link 112. Upon the application server 102 initiating the communication, the application server can verify that the database server 104 is mirroring the database to be accessed by the application server, such as the TX database. The database server 104 can identify to the application server 102 the domain name system (DNS) of the database server mirroring the TX database, such as the DNS "SRV2" of the database server 106. The application server 102 can then store the DNS of the secondary database as SRV 2 as shown in FIG. 2. If the database server 104 associated with the DBPTX DNS request does not have the requested database or if the database is not being mirrored, the application server 102 can fail over to the secondary server via communication link 202.

As the data on the TX database is being accessed by the application server 102 via the communication link 112, the TX database can be mirrored to the database server 106 via communication link 204, so that the database server 106 can be a failover database server with the most recent data. It should also be noted that additional application servers can be accessed the same and/or different databases within the database instance 110 and these databases can also be mirrored on the database server 106 or on different database servers.

Figure 3:
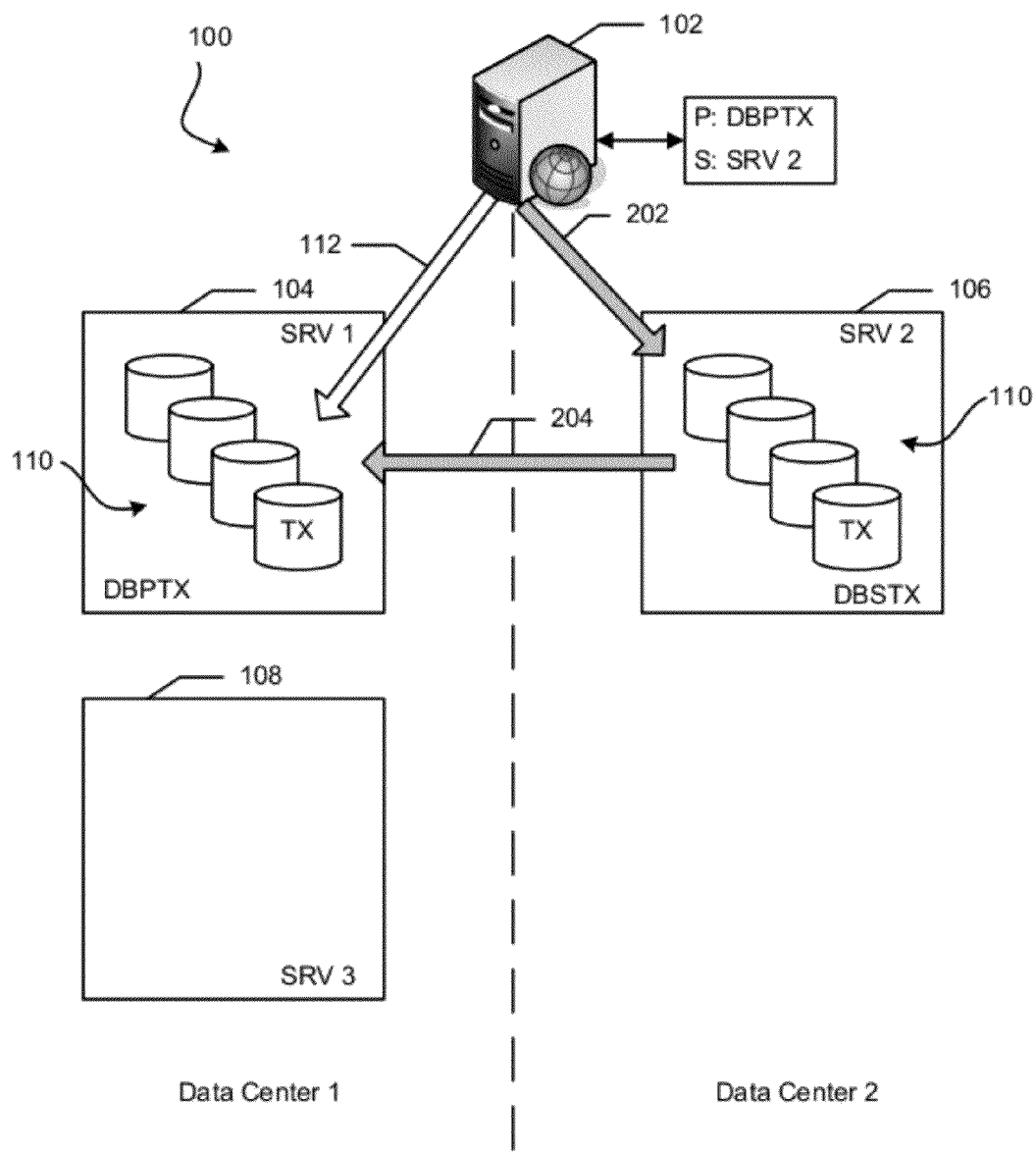

If the TX database on the database server 104 fails or otherwise needs to shut down, the application server 102 can fail over from the database server 104 to the database server 106. A failover can be when the application server 102 changes the database server with which it is in active communication from the database server 104 to the database server 106. The failover can be an automatic event triggered by the load on one of the database servers being to high, a manual event when one of the database servers is going to be decommissioned or going to have an update installed, and/or another operation such that the database server is not accessible by the application server 102. Upon the failover, the application server 102 can communicate with the database server 106 via communication link 202, and the database instance 110 can be mirrored from the database server 106 to the database server 104 via communication link 204 as shown in FIG. 3.

Figure 4:
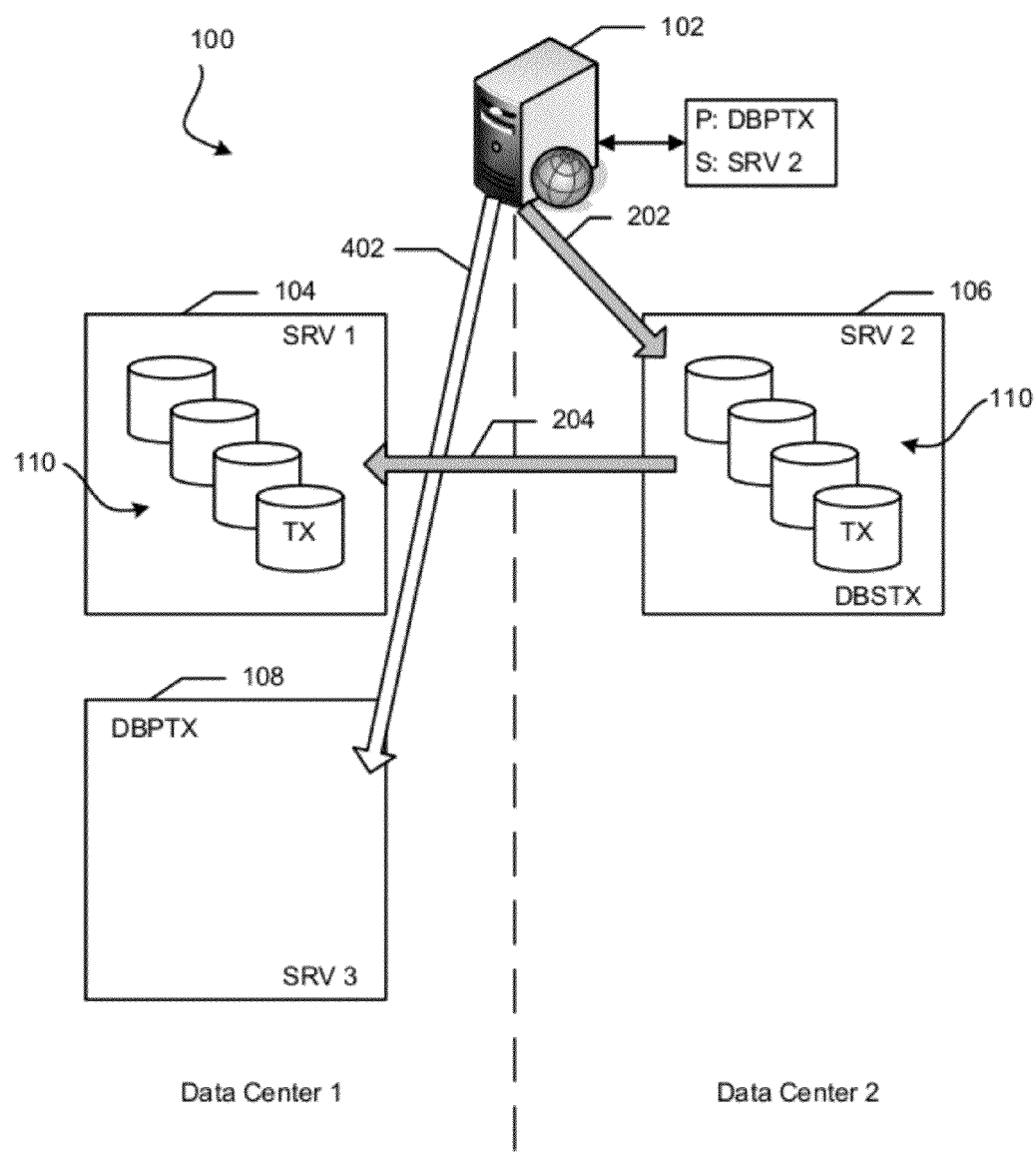

If after the failover of the application server 102 to the database server 106 the TX database is continuing to disrupt the use of the databases in database instance 110 on the database servers 104 and 106, the DNS database name DBPTX can be transferred from the database server 104 to the database server 108 as shown in FIG. 4. The transfer of the DNS request DBPTX from database server 104 to database server 108 can be performed on a domain controller (not shown) in the first data center. Thus, if the application server 102 makes a DNS request for DBPTX, the application server can be placed in active communication with the database server 108 via communication link 402.

Figure 5:
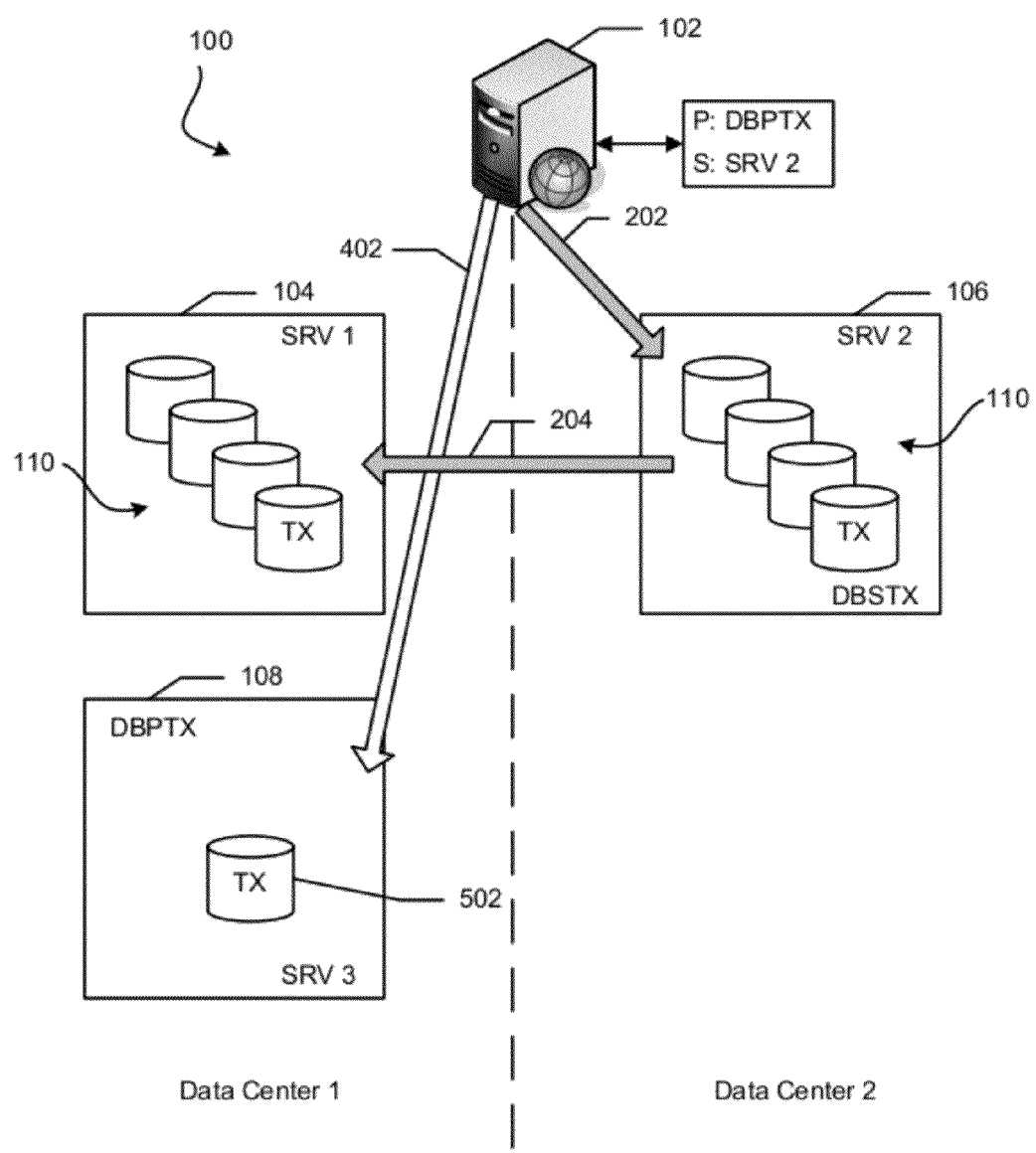

The application server 102 preferably continues to communicate with the database server 106 and the TX database preferably continues to mirror to the database server 104 while the DNS request transfer is taking place between the database servers 104 and 108. Thus, the application server 102 can continually access with TX database without experiencing any downtime. Upon the DNS request transfer being completed, the TX database can be copied from the database server 106 to the database server 108, as represented by TX database 502 in FIG. 5. The TX database can then be removed from the database server 104, and the communication link 204, for mirroring the TX database between database servers 104 and 106, can be broken.

Figure 6:
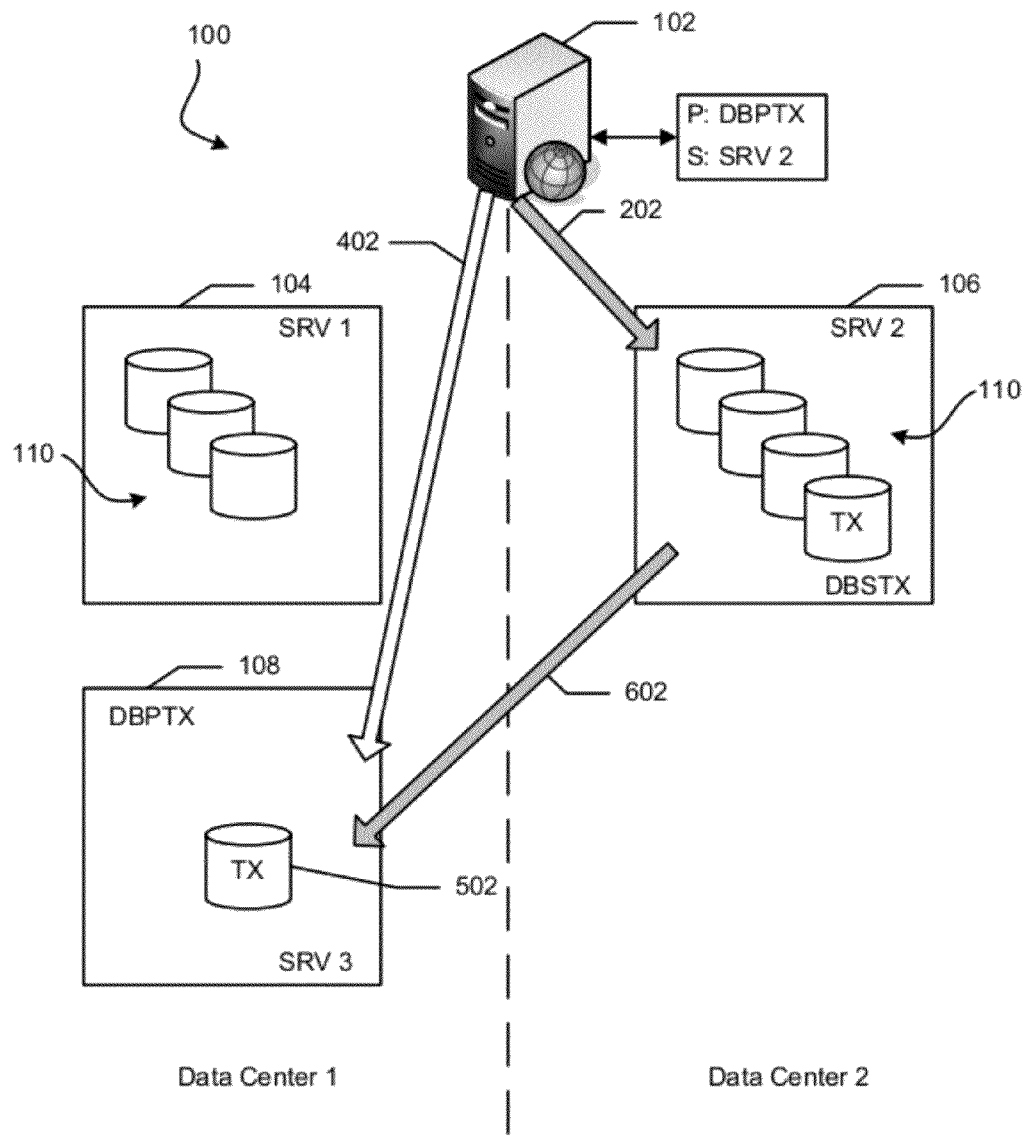
Figure 7:
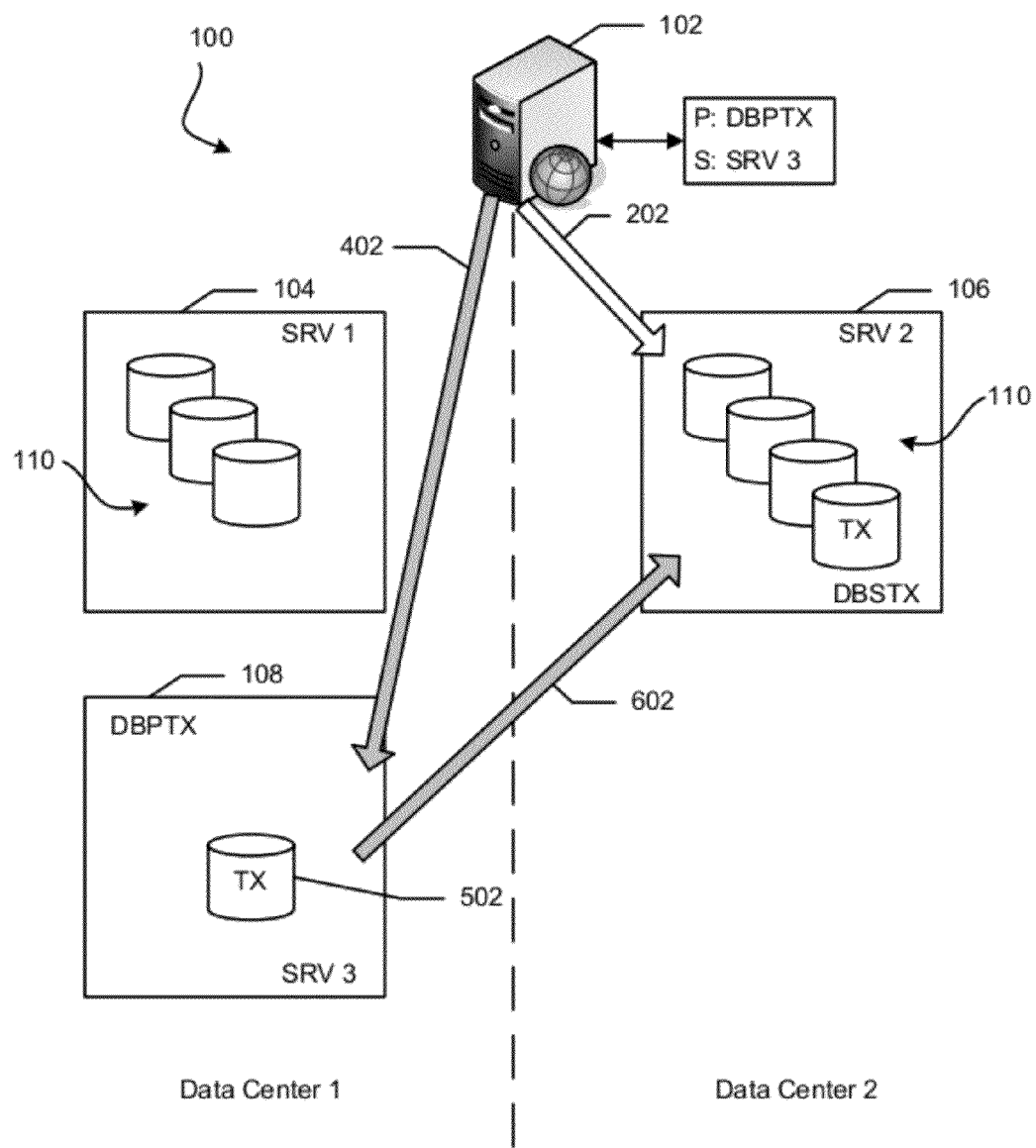

The TX database 502 can then be mirrored from the database server 106 to the database server 108, via communication link 602, so that the most current data is located on the TX database on both database servers 106 and 108 as shown in FIG. 6. If the application server 102 initiates a failover from the secondary database server to the primary database server, the DNS request for DBPTX can cause the application server to become in active communication with the database server 108 via communication link 602 as shown in FIG. 7. As the application server 102 accesses the TX database 502 on the database server 108, the TX database can be mirrored to the database server 106 via the communication link 602.

Figure 8:
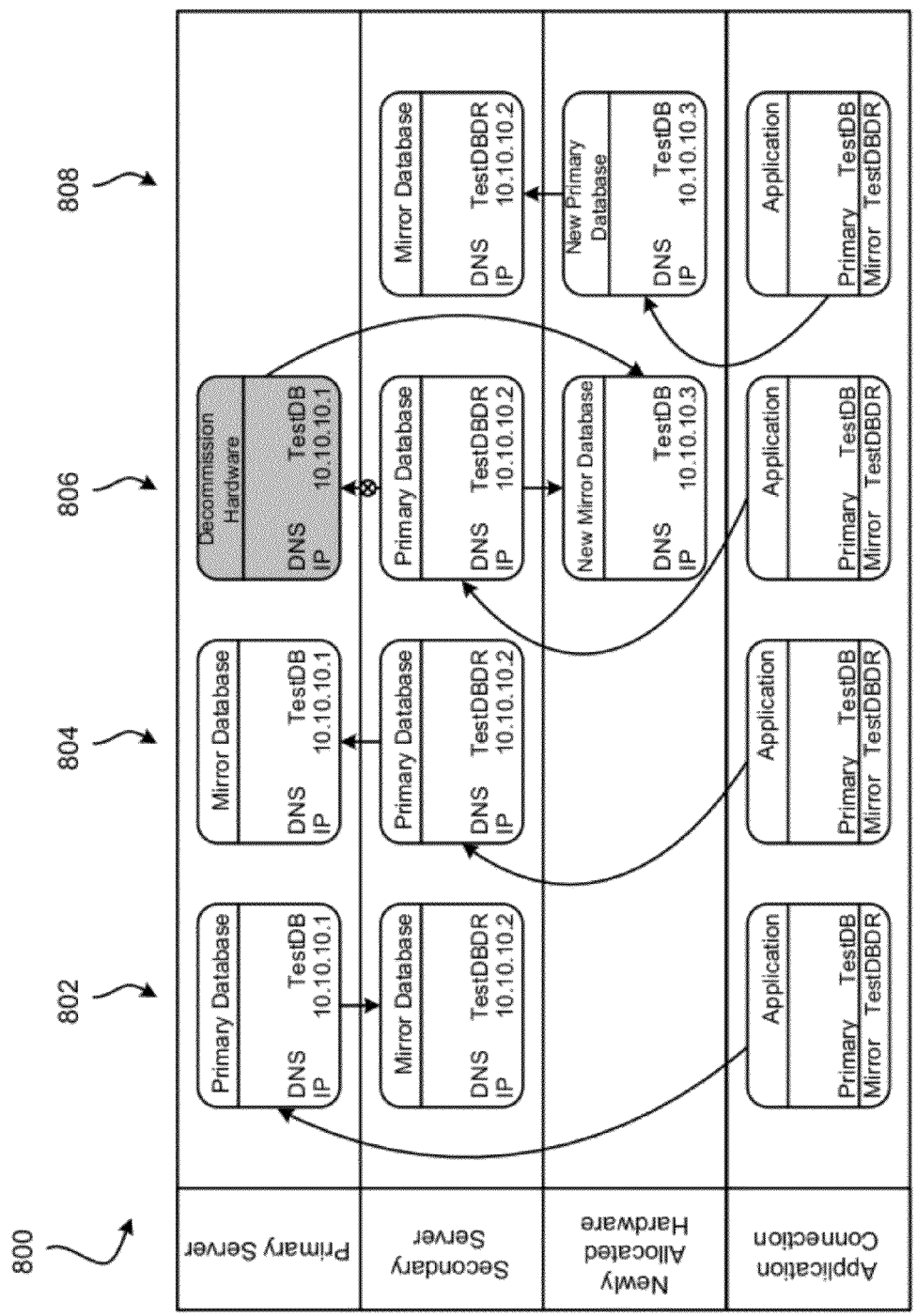
FIG. 8 is a process diagram for transferring a database from one database server to another database server.

FIG. 8 shows a process flow 800 for decommissioning a database server and adding a new database server. At a first process step 802, the application has a primary database server name assignment as TestDB, and a mirror database server name assignment as TestDBDR. The application can communicate with the primary database server by requesting the database server having a DNS TestDB that is associated with the database server having an assigned Internet Protocol (IP) address of 10.10.10.1. Thus, if the application requests the TestDB database server in the first process step 802, the application is placed in an active communication with the database server labeled primary database.

At a second process step 804, the application fails over from the primary database server to the mirror database server. Based on the DNS assignments in the application, during the failover the application can make a DNS request for TestDBDR database server so that the application can fail over to the mirror database. The TestDBDR DNS request can be routed to the database server having the IP address of 10.10.10.2. As the application communicates with the database server associated with the DNS request TestDBDR and the IP address 10.10.10.2, this database can become the primary database for the application in the second process step 804.

At a third process step 806, the application can continue to be in communication with the TestDBDR database server. At this point, the mirror communication link between the TestDBDR database server and the TestDB database server having the IP address 10.10.10.1 can be broken. A new mirror communication link can be established between the TestDBDR database server and a new TestDB database server having an IP address 10.10.10.3. The DNS request TestDB can be remapped from the IP address 10.10.10.1 to the IP address 10.10.10.3. Thus, if the application makes a DNS request for TestDB, the application can be placed in an active communication with database server having the IP address 10.10.10.3. At a fourth process step 808, the application is in active communication with the new primary database server having a DNS TestDB and an IP address 10.10.10.3, and the database being accessed by the application can be mirrored to the mirror database having a DNS TestDBDR and an IP address 10.10.10.2.

Figure 9:
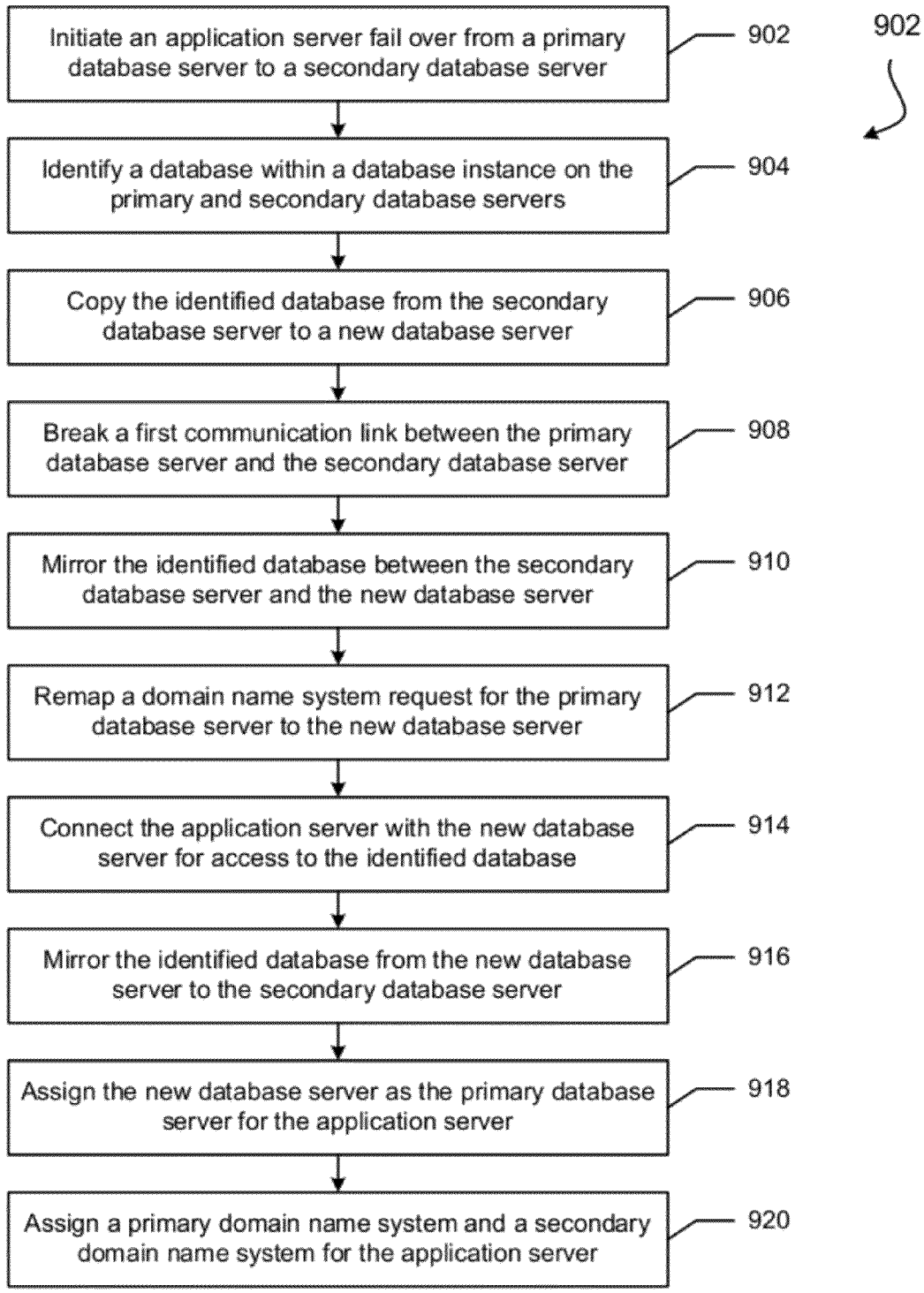
FIG. 9 is a flow diagram of a method for initiating a failover from one database server to another.

FIG. 9 shows a method 900 for initiating a failover from one database server to another. At block 902, an application server is initiated to fail over from a primary database server to a secondary database server. The secondary database server can include a mirror of a database instance located on the primary database, such that the application server can have access to the entire database instance on both of the database servers. A database within the database instance on the primary and secondary databases that is being accessed by the application server is identified at block 904. At block 906, the identified database is copied from the secondary database server to a new database server. A first communication link is broken between the primary database server and the secondary database server at block 908. At block 910, the identified database is mirrored between the secondary database server and the new database server.

A domain name system request for the primary database server is remapped to the new database server at block 912. At block 914, the application server is connected with the new database server for access to the identified database. The identified database is mirrored between the new database server and the secondary database server at block 916. At block 918, the new database server is assigned as the primary database server for the application server. A primary domain name system and a secondary domain name system for the application server are assigned at block 920.

Figure 10:
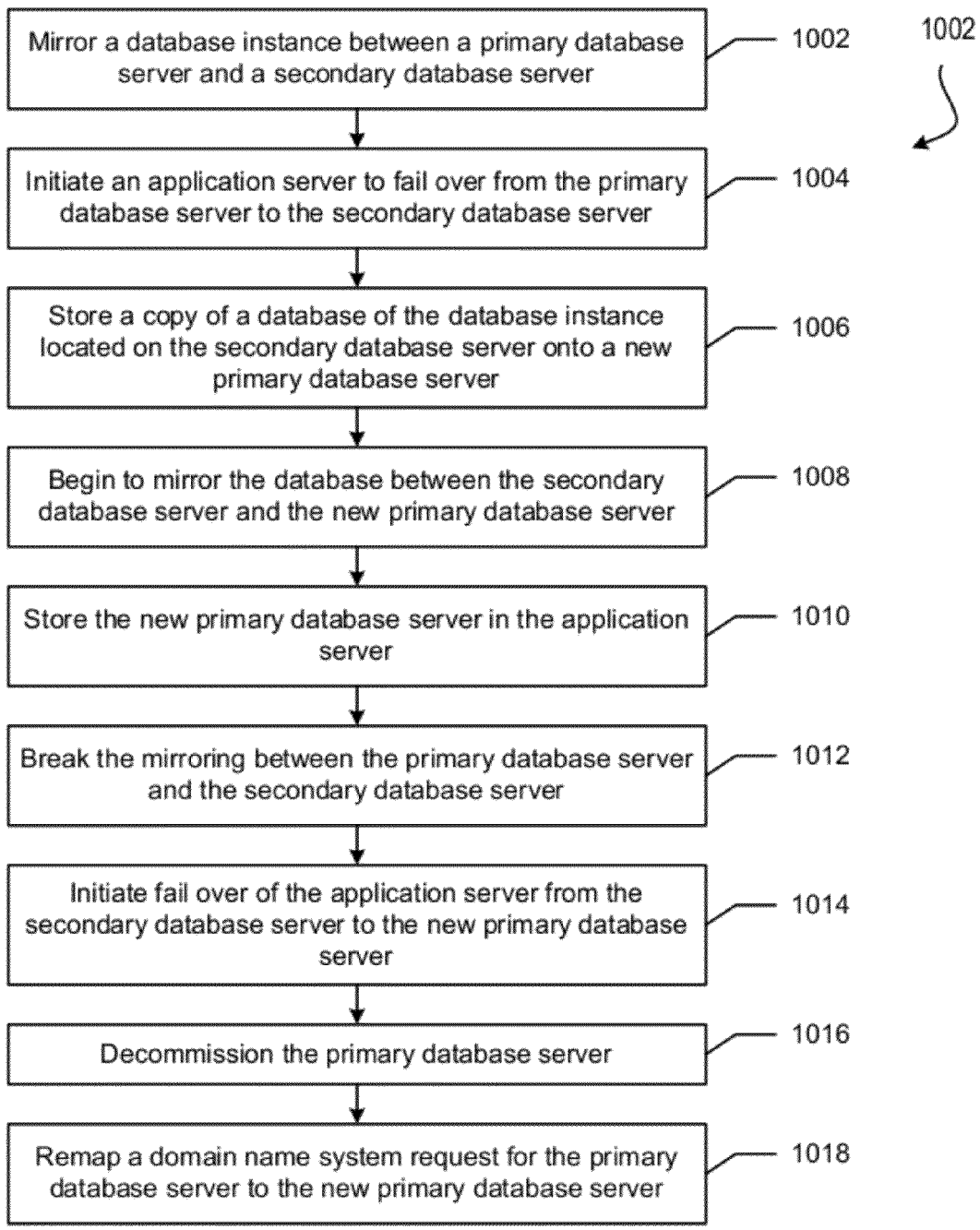
FIG. 10 is a flow diagram of a method for decommissioning a database server and installing a new database server.

FIG. 10 shows a method 1000 for decommissioning a database server and installing a new database server. At block 1002, a database instance stored on both a primary database server and a secondary database server is mirrored between the primary database server and the secondary database server. An application server is initiated to fail over from the primary database server to the secondary database server at block 1004. At block 1006, a copy of a database of the database instance located on the secondary database server is stored onto a new primary database server. The database is begun to be mirrored between the secondary database server and the new primary database server at block 1008. At block 1010, the new primary database server is stored in the application server. The mirroring between the primary database server and the secondary database server is broken at block 1012. At block 1014, the application server is initiated to fail over from the secondary database server to the new primary database server containing the one of the plurality of databases. The primary database server is decommissioned at block 1016. At block 1018, a domain name system request for the primary database server is remapped to the new primary database server.

Figure 11:
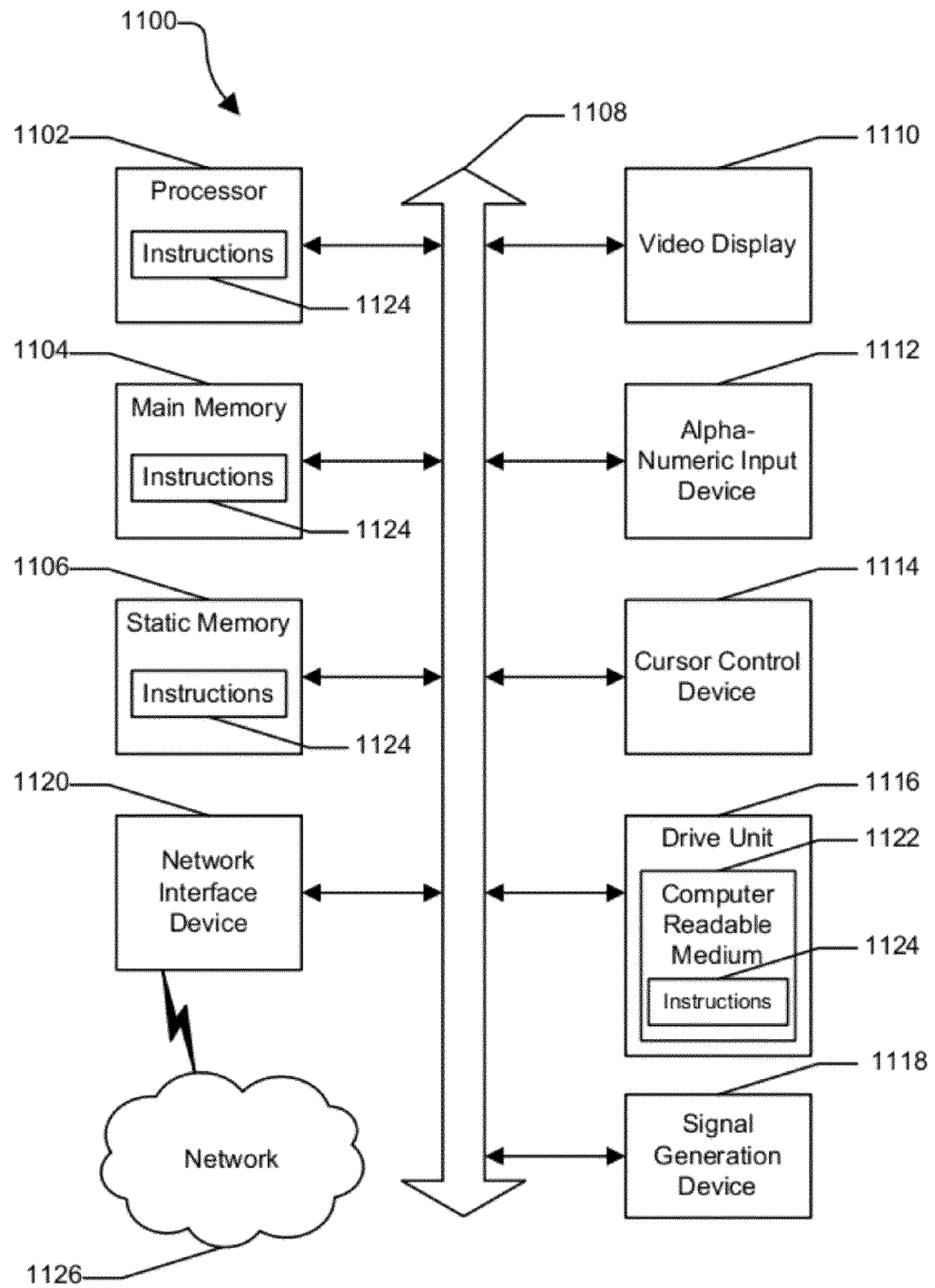
FIG. 11 is a block diagram of a general computer system.

FIG. 11 shows an illustrative embodiment of a general computer system 1100 in accordance with at least one embodiment of the present disclosure. The computer system 1100 can include a set of instructions that can be executed to cause the computer system to perform any one or more of the methods or computer based functions disclosed herein. The computer system 1100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102, e.g. a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media. The network interface device 1120 can provide connectivity to a network 1126, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system comprising:
   a first database server including a database instance;
   a second database server in communication with the first database server, the second database server including a mirror of the database instance, wherein the first database server and the second database server are in a primary and secondary server relationship with the second database server as a secondary server;
   a third database server in communication with the second database server, the third database server configured to store a copy of a database within the database instance; and
   an application server configured to be placed in communication with the first, second, and third database servers, configured to assign the first database server as a primary server and the second database server as the secondary server for the application server, to fail over between the first and second database servers, further configured to fail over between the second and third database servers, and to assign the third database server as the primary server for the application server when the first database server is decommissioned, wherein the third database server and the second database server are in a new primary and secondary server relationship with the second database server as the secondary server.

2. The system of claim 1 further comprising:
   a database center in communication with the first database server and the third database server, the database center configured to decommission the first database server and to remap a domain name system request for the first server to the third server.

3. The system of claim 1 wherein the application server is assigned a first domain name system associated with the first database server, and a second domain name system associated with the second database server.

4. The system of claim 3 wherein the third database server is further configured to be assigned the first domain name system.

5. The system of claim 1 wherein the third database server is further configured to break a first communication link between the first and second database servers, and establish a second communication link between the second and third database servers.

6. A non-transitory computer readable medium comprising a plurality of instructions to manipulate a processor, the plurality of instructions comprising:
   instructions to cause an application server to fail over from a primary database server to a secondary database server, the secondary database server including a mirror of a database instance located on the primary database server;
   instructions to identify a database within the database instance on the primary and secondary databases being accessed by the application server;
   instructions to connect the application server with the secondary database server for access to the identified database in response to a domain name system request for the secondary database server;
   instructions to copy the identified database from the secondary database server to a new database server;
   instructions to break a first communication link between the primary database server and the secondary database server;
   instructions to mirror the identified database between the secondary database server and the new database server;
   instructions to remap a domain name system request for the primary database server to the new server, wherein the domain name system request for the primary database server is different than the domain name system request for the secondary database server; and
   instructions to connect the application server with the new database server for access to the identified database in response to the domain name system request for the primary database server.

7. The computer readable medium of claim 6 further comprising:
   instructions to assign the new database server as the primary database server for the application server.

8. The computer readable medium of claim 6 further comprising:
   instructions to mirror the identified database between the new database server and the secondary database server.

9. The computer readable medium of claim 6 further comprising:
   instructions to assign a primary domain name system and a second domain name system for the application server.

10. The computer readable medium of claim 9 wherein the primary domain name system is associated with the new database server and the secondary domain name system is associated with the secondary database server.

11. The computer readable medium of claim 9 wherein the primary domain name system is associated with the primary database server and the secondary domain name system is associated with the secondary database server.

12. A non-transitory computer readable medium comprising a plurality of instructions to manipulate a processor, the plurality of instructions comprising:
   instructions to mirror a database of a database instance stored on both a primary database server and on a secondary database server, wherein the primary database server and the secondary database server have an existing primary and secondary server relationship;
   instructions to initiate an application server to fail over from the primary database server to the secondary database server;
   instructions to store a copy of the database of the database instance located on the secondary database server onto a new primary database server;

instructions to remove the database from the primary database server in response to a completion of the copying of the database from the secondary database server onto the new primary database server;

instructions to begin mirroring the database between the secondary database server and the new primary database server;

instructions to store the new primary database server in the application server;

instructions to break the mirroring between the primary database server and the secondary database server; and instruction to initiate the application server to fail over from the secondary database server to the new primary database server containing the database, wherein the new primary database server and the secondary database server have a new primary and secondary server relationship.

13. The computer readable medium of claim 12 wherein the failover is initiated in response to a decommission process for the primary database server.

14. The computer readable medium of claim 12 further comprising:
instructions to decommission the primary database server.

15. The computer readable medium of claim 12 further comprising:
instructions to remap a domain name system request for the primary database server to the new primary database server.

16. The computer readable medium of claim 12 wherein the failover is initiated in response to a network load on the primary database server being above a specific amount.

17. The computer readable medium of claim 12 wherein the mirroring between the primary database server and the secondary database server is via a first communication link and the mirroring between the secondary database server and the new primary database server is via a second communication link.

* * * * *